United States Patent
Tuttle

(10) Patent No.: US 11,596,981 B2
(45) Date of Patent: *Mar. 7, 2023

(54) MODULAR STAR FOR GRADING, CLEANING AND TRANSPORTING PRODUCE

(71) Applicant: NW Polymers, Hillsboro, OR (US)

(72) Inventor: James A. Tuttle, Hillsboro, OR (US)

(73) Assignee: NW Polymers, Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,262

(22) Filed: Jan. 11, 2021

(65) Prior Publication Data
US 2021/0205848 A1 Jul. 8, 2021

Related U.S. Application Data

(63) Continuation of application No. 15/851,431, filed on Dec. 21, 2017, now Pat. No. 10,888,899.

(60) Provisional application No. 62/438,405, filed on Dec. 22, 2016, provisional application No. 62/438,411, filed on Dec. 22, 2016, provisional application No. 62/438,399, filed on Dec. 22, 2016, provisional application No. 62/438,396, filed on Dec. 22, 2016.

(51) Int. Cl.
*A23N 12/00* (2006.01)
*B07B 1/15* (2006.01)

(52) U.S. Cl.
CPC .............. *B07B 1/155* (2013.01); *A23N 12/00* (2013.01)

(58) Field of Classification Search
CPC ................................. B07B 1/155; A23N 12/00

USPC .......................................................... 209/351
See application file for complete search history.

(56) References Cited

U.S. PATENT DOCUMENTS

| | | | |
|---|---|---|---|
| 1,524,360 A | 1/1925 | Lauritzen | |
| 1,899,292 A | 2/1933 | Rienks | |
| 2,244,546 A | 6/1941 | Stockdale | |
| 4,533,464 A | 8/1985 | Smith et al. | |
| 4,557,388 A * | 12/1985 | Peterson | B07B 13/04 209/931 |
| 5,480,034 A | 1/1996 | Kobayashi | |

(Continued)

FOREIGN PATENT DOCUMENTS

| | | | |
|---|---|---|---|
| CN | 111992517 A * | 11/2020 | |
| DE | 20000985 U1 * | 5/2000 | A01D 33/08 |

(Continued)

OTHER PUBLICATIONS

Bruks Klockner, Disc Screen brochure, date unknown, accessed Jun. 17, 2013, 2 pgs.

(Continued)

*Primary Examiner* — Terrell H Matthews
(74) *Attorney, Agent, or Firm* — Kolisch Hartwell, P.C.

(57) ABSTRACT

A modular star system for grading, cleaning, and transporting produce includes opposing, first and second hub modules with opposing, tapered surfaces, and plural finger modules separated by the first and second hub modules. Each finger module has finger members that are color-coded and the finger module and first and second hub modules are disposed on a rotatable shaft. Outer surfaces of either of the finger or hub modules are color-coded, and are substantially (Continued)

perpendicular to the long axis of the shaft. There is also a method of using the modular star system for grading, cleaning, and transporting produce.

2 Claims, 10 Drawing Sheets

(56) References Cited

U.S. PATENT DOCUMENTS

| | | | |
|---|---|---|---|
| 6,237,778 B1 | 5/2001 | Weston | |
| 6,241,100 B1 * | 6/2001 | Tanner | B07B 1/4609 |
| | | | 209/667 |
| 6,250,477 B1 | 6/2001 | Swanink | |
| 6,253,535 B1 | 7/2001 | Paulson, Jr. et al. | |
| 6,543,212 B2 | 4/2003 | Tonutti | |
| 6,669,612 B2 | 12/2003 | Jager | |
| 10,888,899 B2 * | 1/2021 | Tuttle | A23N 12/00 |
| 2002/0049124 A1 | 4/2002 | Jager | |
| 2005/0109738 A1 * | 5/2005 | Hewett | H05H 1/34 |
| | | | 219/121.48 |
| 2006/0180510 A1 | 8/2006 | Freissle et al. | |
| 2007/0138068 A1 * | 6/2007 | Davis | B07B 1/15 |
| | | | 209/672 |
| 2008/0196562 A1 * | 8/2008 | Elliston | B25B 13/56 |
| | | | 81/433 |
| 2011/0049022 A1 | 3/2011 | Davis | |
| 2011/0094944 A1 | 4/2011 | Bruggencate et al. | |
| 2014/0202933 A1 | 7/2014 | Benjamins | |
| 2016/0318070 A1 | 11/2016 | Davis | |
| 2017/0304868 A1 | 10/2017 | Parr | |
| 2018/0071785 A1 | 3/2018 | Valerio | |
| 2018/0178253 A1 * | 6/2018 | Tuttle | B07B 1/155 |

FOREIGN PATENT DOCUMENTS

| | | | | |
|---|---|---|---|---|
| DE | 20017403 U1 * | 1/2001 | | A01B 29/041 |
| DE | 10065403 A1 * | 7/2002 | | B07B 1/15 |
| DE | 10065403 A1 | 7/2002 | | |
| EP | 2181575 A1 | 5/2010 | | |
| EP | 2436255 A1 | 4/2012 | | |
| GB | 2241937 A * | 9/1991 | | B65F 1/00 |
| JP | 2006021089 | 1/2006 | | |
| WO | 0115821 A1 | 3/2001 | | |
| WO | WO-2012022574 A1 * | 2/2012 | | A46B 15/00 |

OTHER PUBLICATIONS

Bulkhandling Sytems, Debris Roll Screen brochure, date unknown, accessed Jun. 17, 2013, 2 pgs.

Progress Industries Inc., Disc Screen brochure, date unknown, accessed Jun. 17, 2013 4 pgs.

Young, Lee W., Authorized Officer, International Searching Authority / US Commissioner for Patents, "International Search Report" in connection with related International Application No. PCT/US2017/068016, dated Apr. 25, 2018, 2 pgs.

Young, Lee W., Authorized Officer, International Searching Authority / US Commissioner for Patents, "Written Opinion of the International Searching Authority" in connection with related International Application No. PCT/US2017/068016, dated Apr. 25, 2018, 8 pgs.

* cited by examiner

MODULAR STAR FOR GRADING, CLEANING AND TRANSPORTING PRODUCE

CROSS REFERENCE TO RELATED APPLICATIONS

The present application is a continuation of U.S. patent application Ser. No. 15/851,431, filed Dec. 21, 2017, now U.S. Pat. No. 10,888,899, which application claims priority to the following U.S. Provisional patent applications: (1) Ser. No. 62/438,396, filed on Dec. 22, 2016; (2) Ser. No. 62/438,399, filed Dec. 22, 2016; (3) Ser. No. 62/438,405, filed Dec. 22, 2016; and (4) Ser. No. 62/438,411, filed Dec. 22, 2016, each application which is incorporated herein, in its entirety, for all purposes.

FIELD OF THE DISCLOSURE

This disclosure relates to handling equipment for produce. More particularly, this disclosure relates to a modular star system for grading, cleaning, and transporting produce.

INTRODUCTION

Previous grading, cleaning, and transporting members of produce handling equipment utilized single piece members frequently referred to as stars (or rollers).

The modular star system of the present disclosure allows for the separation of wear components (e.g. fingers) from non-wear components (e.g., hubs having a spacing functionality), which may reduce replacement costs as compared to a one piece star, and may facilitate the use of materials with different properties for different modules and/or for different applications.

For example, equipment members for handling delicate produce, such as potatoes, may be made of soft materials in order to avoid bruising the produce. However, these soft materials may have several disadvantages. In particular, soft materials may rotate on a drive shaft relative to the shaft, and/or compress making alignment of subsequent shafts difficult.

Examples of systems for grading, cleaning, and/or transporting items are described in the following patents and publications, which are hereby incorporated by reference in their entireties for all purposes: US2002049124; U.S. Pat. Nos. 1,899,292; 6,241,100; 4,557,388; 6,237,778; EP2181575; JP2006021089; US2011049022; U.S. Pat. Nos. 5,480,034; 6,669,612; 6,253,535; 1,524,360; 2,244,546; EP2436255; U.S. Pat. Nos. 6,543,212; 6,250,477; WO0115821; DE10065403; U.S. Pat. Nos. 5,740,922; 2,618,385; 3,519,129; and 3,870,627.

SUMMARY OF THE INVENTION

The modular star system disclosed herein may include separable finger section and hub modules serially disposed next to each other on a shaft, an overall thickness of the finger section module being substantially equal to the thickness of its finger members. Some embodiments may include a majority of the finger section module being made of a softer material than the hub module; a plurality of different finger section modules having different materials/geometries; a plurality of different hub modules having different materials/geometries; and/or a core of the finger section module and a core of the hub module (or a majority of the hub module) being made of a rigid material.

The modular star system may include adjacent finger section modules separated by first and second separable opposing hub modules having opposing tapered surfaces.

The modular star system may include a color-coding system to allow for identification of material compositions and geometries of specific components. The finger members may be color coded to indicate a material composition or geometry of the finger module.

The finger and hub modules may be disposed on the shaft configured to rotate about a long axis, wherein outer surfaces of either of the finger or hub modules are color coded to indicate a material composition or geometry of the module, the outer surfaces being substantially perpendicular to the long axis of the shaft.

Features of the present invention will be more readily understood after considering the Drawings and the Detailed Description.

Attachments A-C show additional versions of the invention.

DETAILED DESCRIPTION OF THE DISCLOSURE

Examples of a modular star system and method of use are shown in FIGS. 1-10. Unless otherwise specified, a modular star system may, but is not required to contain at least one of the structure, components, functionality, and/or variations described, illustrated, and/or incorporated herein.

Figure 1:
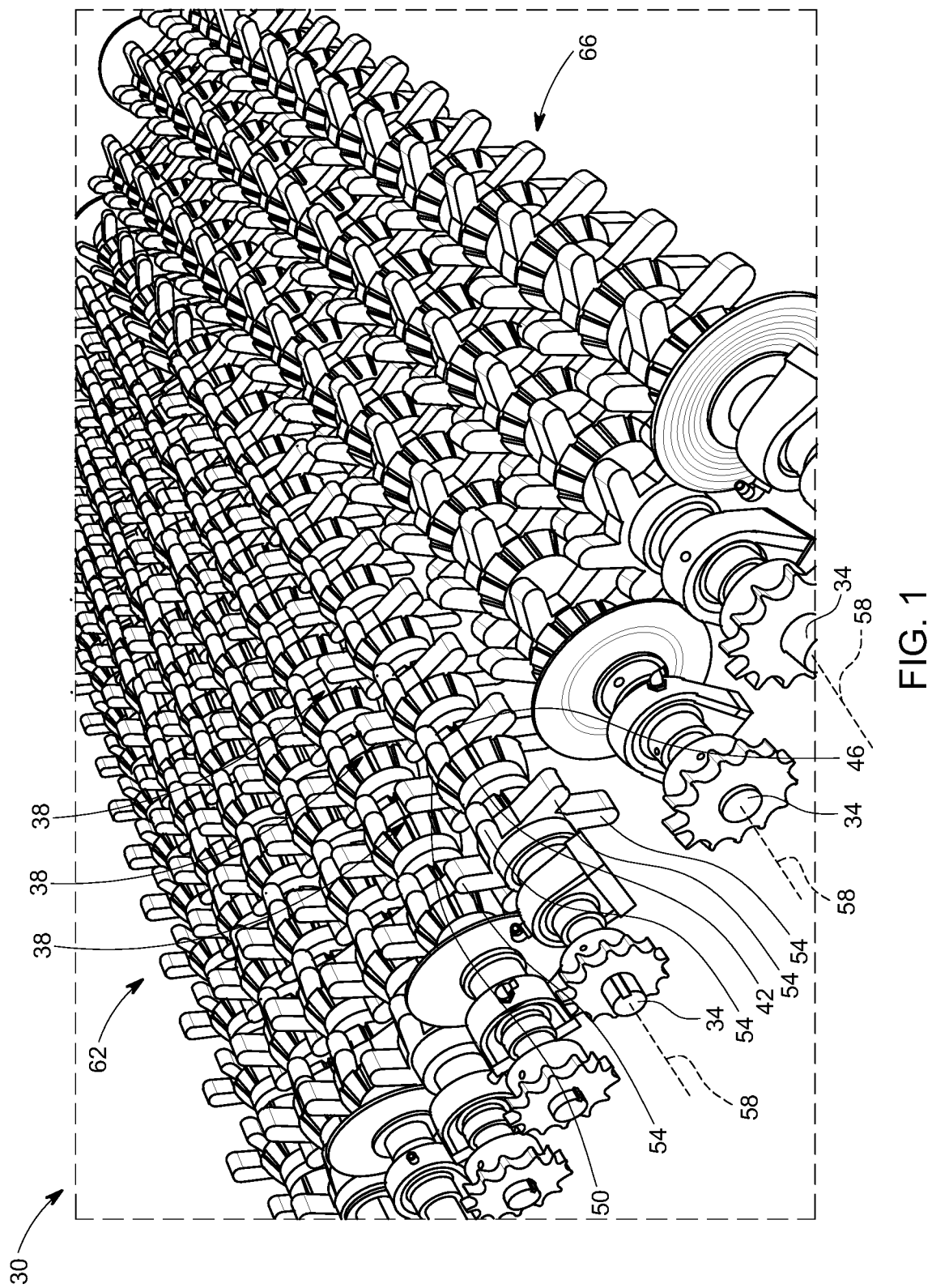
FIG. 1 is a photograph of a system for grading, cleaning, and transporting produce, according to the present disclosure.

FIG. 1 shows a system 30 for grading, cleaning, and transporting produce (e.g., potatoes), according to the present disclosure. System 30 may include a plurality of shafts 34 upon which a plurality or combination of modular stars 38 are serially disposed.

Each modular star may include separable first, second, and third modules, such as first and second hub modules 42, 46 disposed on opposite sides of a finger section module 50. Finger section module 50 may include a plurality of fingers 54.

In general, system 30 may include an alignment and support apparatus (not shown) configured to align (e.g., in parallel) and support shafts 34. System 30 may include a drive mechanism (not shown) configured to rotate shafts 34 and the corresponding modular stars 38 about respective longitudinal axes 58.

System 30 may be configured to transport produce from an input side 62 toward an output side 66. For example, the rotation of shafts 34 may cause fingers 54 to contact the produce and urge the produce toward output side 66.

System 30 may be configured to clean produce. For example, a force exerted on the produce by fingers 54 may dislodge dirt from surfaces of the produce.

One or more components of system 30, or a surface thereof, may be made of polyurethane to reduce adhesion of dirt and mud to those components, which may significantly reduce cleaning time associated with system 30.

System 30 may be configured to grade produce. For example, the alignment and support apparatus of system 30 may provide for selective spacing between adjacent shafts 34 to define a plurality of predetermined grading gaps of varying sizes between corresponding adjacent shafts 34.

Each grading gap may be defined by a space between first and second hub modules of adjacent modular stars on a first shaft, and between the corresponding finger section module on an adjacent second shaft (e.g., between first hub module 42 of a first modular star, second hub module 46 of a second modular star, and finger section module 50 of a third modular star).

Adjacent shafts 34 may have staggered arrangements of module stars 38. For example, every other shaft 34 may omit first hub module 42 nearest an end of that shaft to align (or center) finger section module 50 with opposing hub modules on the adjacent shaft 34, as shown.

Shafts 34 may be aligned (and/or modular stars 38 may be dimensioned) so that the predetermined grading gaps generally increase in size from input side 62 to output side 66. As the produce is transported from input side 62 toward output side 66 by fingers 54, produce of a particular grade size may pass through a correspondingly sized grade gap into a receptacle or other suitable apparatus corresponding to the grade size.

Figure 2:
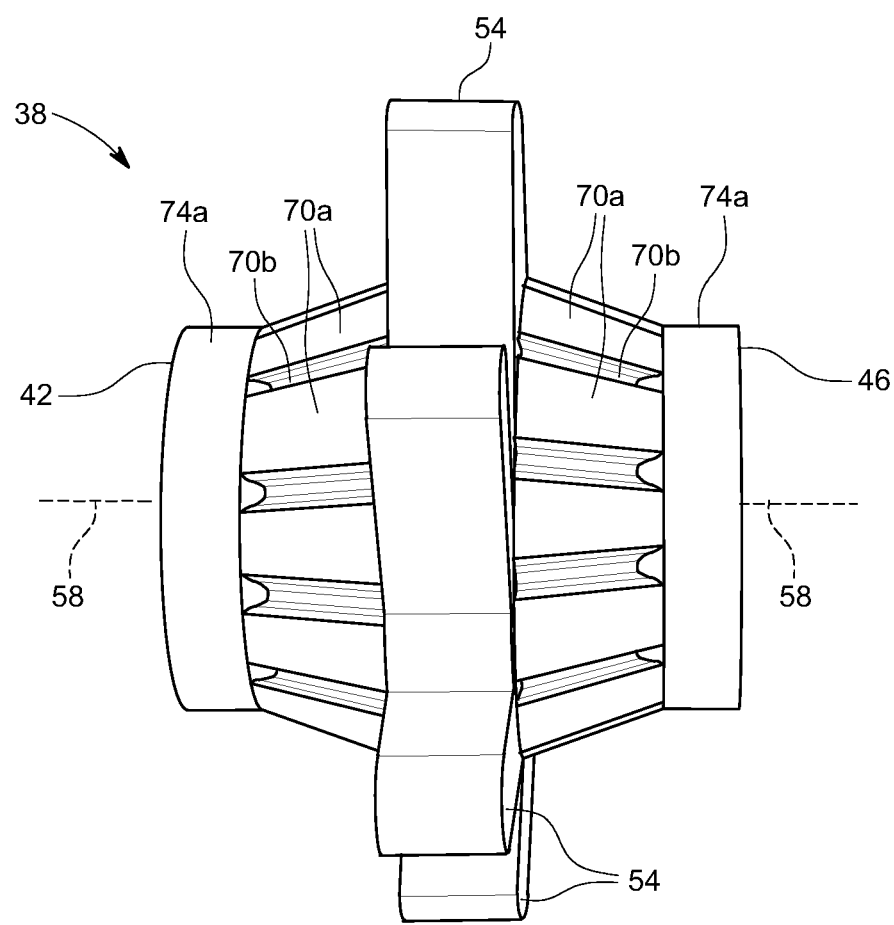
FIG. 2 is a photograph of a modular star of FIG. 1 with first and second hub modules pressed against opposite sides of a finger section module.

FIG. 2 shows one of modular stars 38 removed from the shaft. First and second hub modules 42, 46 may include respective shoulder portions 70 and ring portions 74. Shoulder portions 70 may include a slanted, tapered, and/or frustoconical surface 70a having longitudinal grooves 70b. Ring portion 74 may include a curved surface 74a. When assembled on the shaft (e.g., along axis 58), the slanted surface of shoulder portion 70 may taper from a region proximal finger section module 50 to a region proximal ring portion 74 of the respective hub module, and curved surface 74a may extend parallel to axis 58 of the shaft and may be curved about a radius perpendicular to axis 58.

As the shaft causes modular star 38 to rotate about axis 58, fingers 54 are likely to exert a greater force on the produce being conveyed, cleaned, and/or graded than either of surfaces 70a or 74a. To prevent fingers 54 from bruising the produce, fingers 54 may be composed of a relatively soft, flexible, and/or resilient material (e.g., polyurethane). In contrast, hub modules 42, 46 and surfaces 70a, 74a may be made of a relatively harder, less flexible, and/or less resilient material (e.g., a hard polymer or harder polyurethane).

As a result of force exerted and/or material composition, the material of fingers 54 (and finger section 50) may become worn (or break down) in a shorter duration of time than the material of either of hub modules 42, 46. In this regard, finger section module 50 may be described as a wear (or high wear) component of system 30, and hub modules 42, 46 may be described as non-wear (or low wear) components of system 30.

Figure 3:
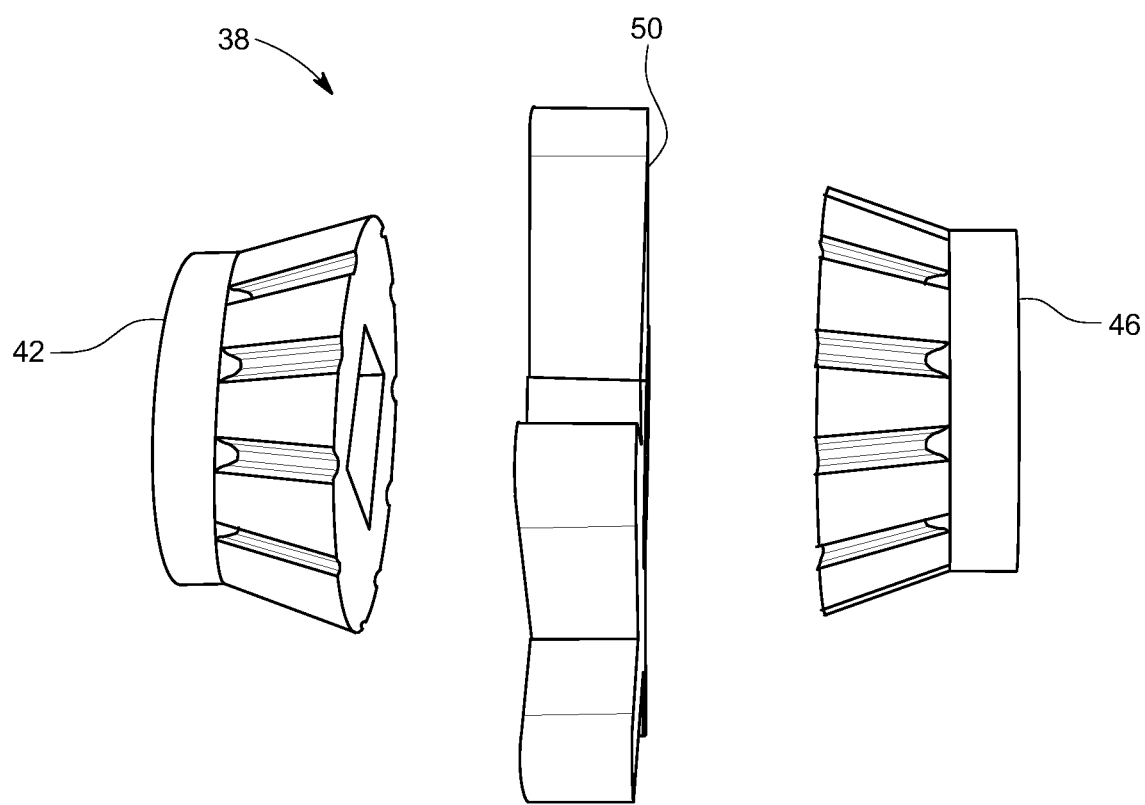
FIG. 3 is a photograph of the module star of FIG. 2 with the first and second hub modules separated from the finger section module.

Modular star 38 may allow for separation of high wear components from low wear components, which may reduce operational costs associated with system 30 (see FIG. 1). For example, FIG. 3 shows hub modules 42, 46 separated from finger section module 50. As shown, an overall thickness of the finger section module 50 is substantially equal to the thickness of the finger members.

When finger section module 50 becomes worn (e.g., a torn finger), finger section module 50 may be removed from the shaft and replaced with a new (or less worn) finger section module, while less worn hub modules 42, 46 may be reused, which reduces replacement costs associated with system 30. The separation of the finger section from the hubs provides for the use of more costly materials that better match an application while controlling costs through the reuse of the hubs.

As shown, hub modules 42, 46 may be identically constructed, which may allow hub modules 42, 46 to be interchanged in system 30, thus reducing time required to align modular stars 38 on the shaft.

Figure 4:
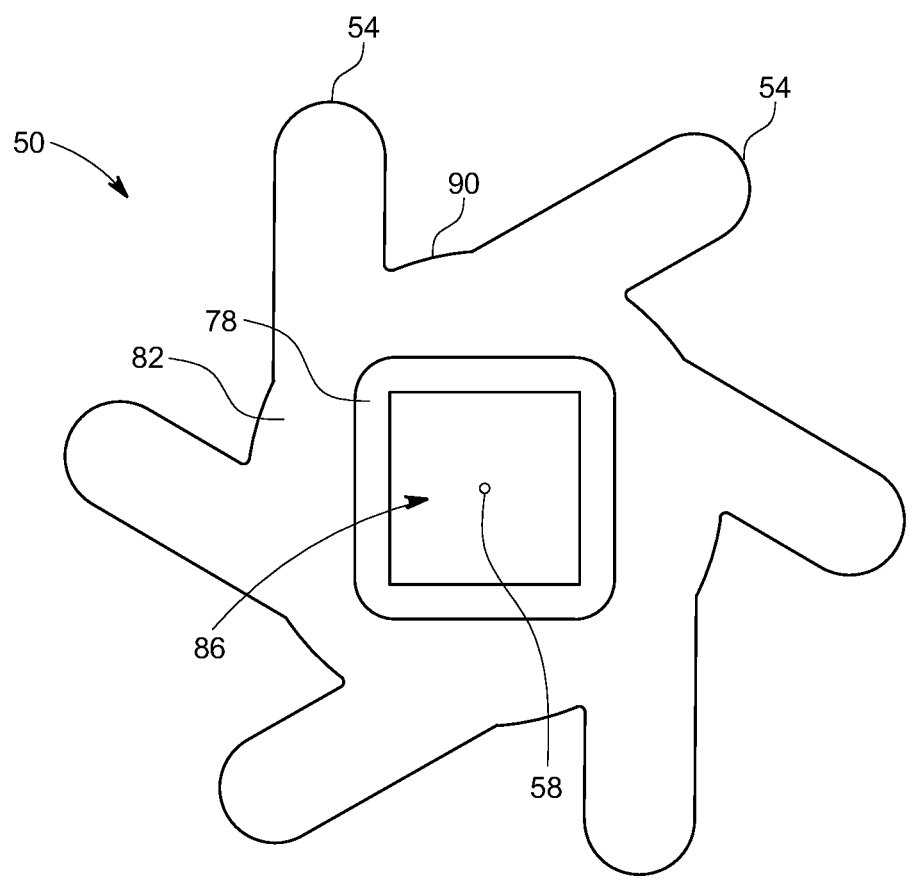
FIGS. 4 and 5 are photographs of opposite sides of the finger section module of FIG. 2.
Figure 5:
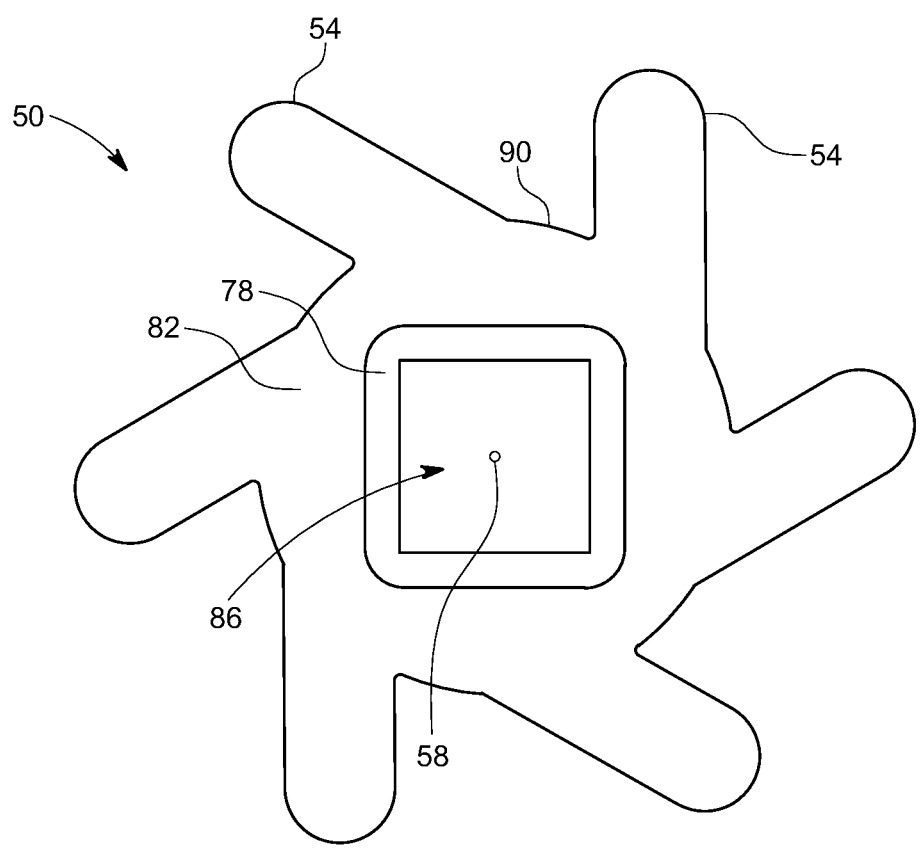

FIGS. 4-5 show opposite sides of finger section module 50. Finger section module 50 may include a core 78 and an intermediate portion 82. Core 78 may include a non-circular aperture 86 for receiving a correspondingly shaped portion of the shaft. For example, FIGS. 4-5 show core 78 as having a square shaped aperture 86 configured to be slid (or snuggly fit) onto a portion of shaft 34 having a square shaped cross-section, the cross-section being taken in a plane perpendicular to axis 58. Axis 58 is shown normal to the view of FIGS. 4-5.

Core 78 may be made of a material (e.g., metal or polymer) that is harder than the material of fingers 54. Intermediate portion 82 may be bonded or mechanically locked to core 78. Intermediate portion 82 may be made of the same material as fingers 54.

The use of hard core 78 bonded (or mechanically locked) to softer intermediate portion 82 and fingers 54 may reduce a possibility of finger section module 50 rotating relative to shaft 34 during operation of system 30 (see FIG. 1).

When aligning and/or sliding finger section modules 50 onto shaft 34 (e.g., into an operative position for subsequent rotation about axis 58), the hardness of core 78 may reduce a likelihood of finger section modules 50 compressing or deforming in a direction substantially parallel to axis 58. If finger section modules 50 are allowed to compress or deform in such a direction, then alignment of subsequent shafts (e.g., centering fingers 54 of the first shaft with opposing hub modules of the second or adjacent shaft) may prove difficult.

Intermediate portion 82 may have a circular shape, which may be centered about axis 58. Intermediate portion 82 may include a base portion 90 extending between adjacent fingers 54. For example, FIGS. 4-5 show base portion 90 as being rounded (or convexly curved) about a radius of the circular shape of intermediate portion 82. Rounding base portion 90 may reduce a stress point and source of failure common in prior art systems.

Figure 6:
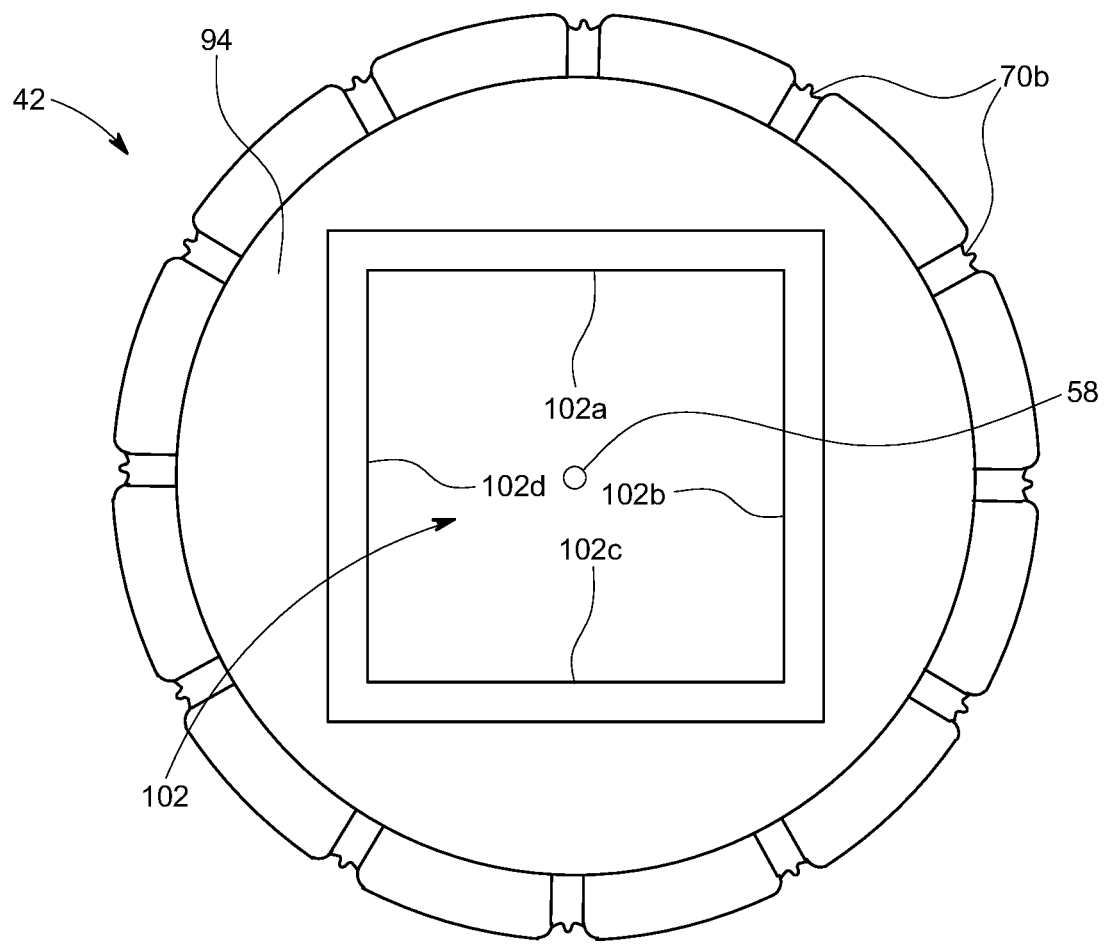
FIGS. 6 and 7 are photographs of opposite sides of one of the hub modules of FIG. 2.
Figure 7:
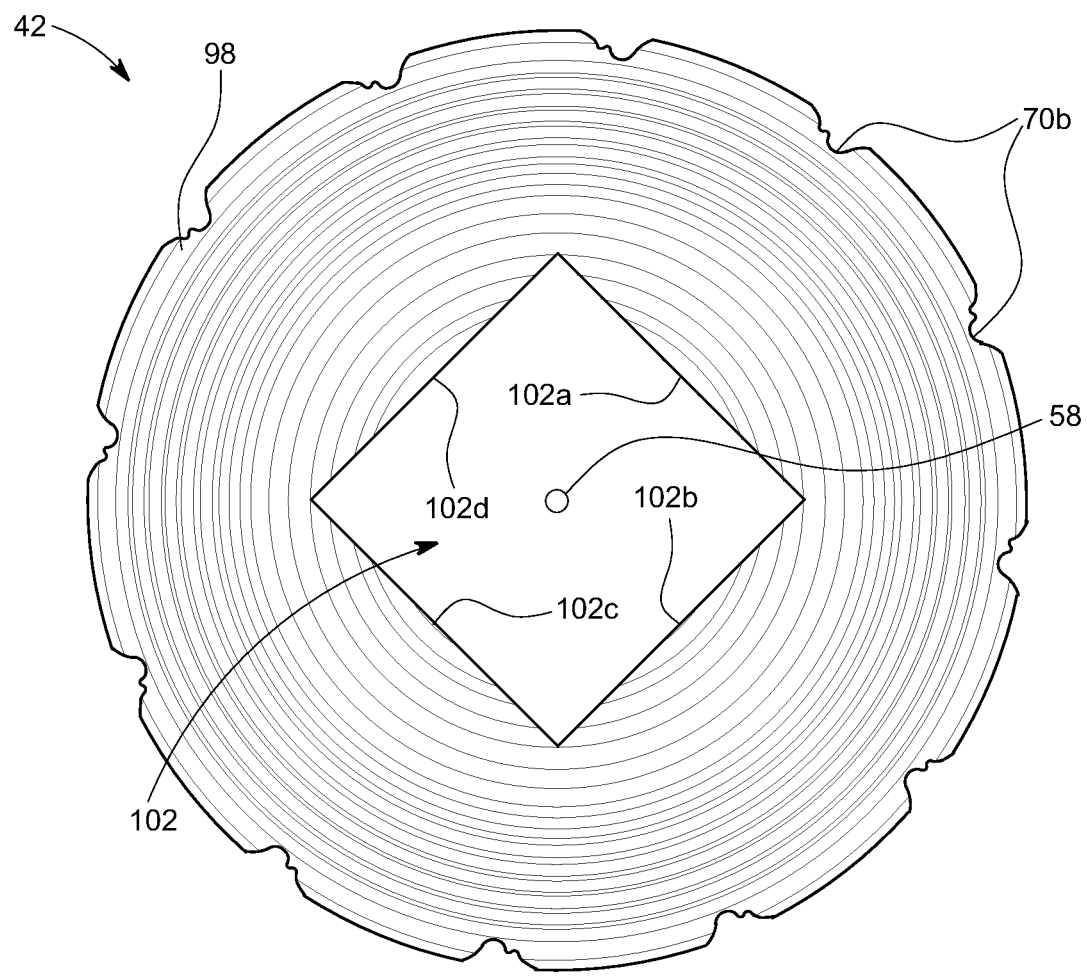

FIGS. 6-7 show opposite sides of hub module 42. As described, hub module 46 may be of a similar (or identical) construction as hub module 42. As shown, hub module 42 includes a first substantially planar side 94 (see FIG. 6); a second substantially planar side 98 (see FIG. 7); and a non-circular aperture 102 (shown here as a generally square shaped aperture) extending between sides 94, 98 for receiving the correspondingly shaped portion of the shaft.

As shown, first and second sides 94, 98 have respectively smaller and larger circular perimeters. The smaller circular perimeter of first side 94 may be configured to interface and/or align with a corresponding first side of hub module 46 of an adjacent modular star. The larger circular perimeter of second side 98 may be configured to interface and/or align with either side of intermediate portion 82 of finger section module 50 (see FIGS. 4-5). As shown, recesses 70b may extend through second side 98 to create recesses or gaps in the larger circular perimeter, and second side 98 may include a plurality of concentric circular channels centered about axis 58. These channels may interface with the soft material of intermediate portion 82 of finger section module 50 (see FIGS. 4-5) to prevent dirt, water, or other foreign material from intruding into aperture 102 and/or coming in contact with the shaft, which may in turn prevent corrosion of the shaft, for example.

Aperture 102 may be configured to extend an operational lifespan of hub module 42. For example, aperture 102 may include convexly curved sidewalls 102a-d configured to exert a clamping force on the shaft. Over time, the resiliency of the material of hub module 42 may decrease, which may result in a reduction of the clamping force. However, a nonzero clamping force may allow for aperture 102 to snuggly interface with the cross-section of the shaft despite a reduction in material resiliency.

Figure 8:
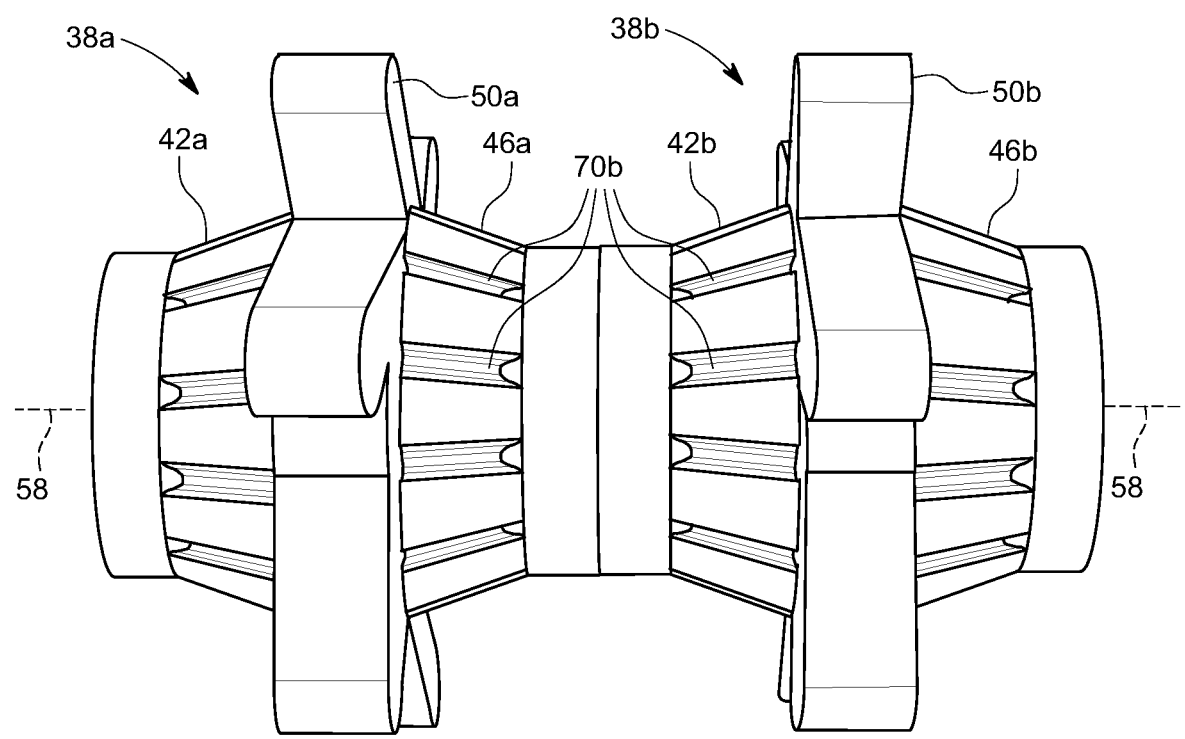
FIG. 8 is a photograph of modular stars having hub and finger section modules made of different materials, according to the present invention.

FIG. 8 shows modular stars 38 as having hub and finger section modules made of different materials in the operative position on the shaft (not shown).

Modular star 38a may include a finger section module 50a made of a first material, a first hub module 42a made of the first material, and a second hub module 46a made of a third material. Modular star 38b may include a first hub module 42b made of the first material, a finger section module 50b made of a fourth material, and a second hub module 46b made of the first material.

Different materials in the system made be color-coded. The use of colored polyurethane may allow for color coding of each module for identification of different material compositions (e.g., hardness or other predetermined material characteristic). For example, the first, second, third, and fourth materials may be given respective color-codes of a first, second, third, and fourth selected, distinct, and/or identifiable colors.

As shown in FIG. 8, the color codes may be associated with colored surfaces (e.g., surfaces 70a, 74a, 90—see FIGS. 2 and 4) and/or components (e.g., fingers 54), which may be visible when modular stars 38 are in the operative position on the shaft. For example, the color-coded surfaces may extend substantially parallel to the direction of axis 58, and color-coded components may protrude substantially perpendicular to axis 58.

As modular stars 38 rotate about axis 58, portions of the hub modules (e.g., edges of recesses 70b) may strike or otherwise exert a force on the produce. In this case, among others, it may be desirable for portions of the hub modules to be made of relatively soft materials to avoid bruising the produce. For example, hub module 42b may include a hard core (e.g., made of a material such as metal or polymer) bonded to a softer coating (e.g., made of a material such as polyurethane). The softer coating may be colored polyurethane corresponding to the first material and the first color, as shown in FIG. 8.

In the operative position, opposing hub modules (e.g., hub modules 46a,42b) may have opposing tapered surfaces. These opposing tapered surfaces may tapered toward one another, as shown in FIG. 8.

Figure 9:
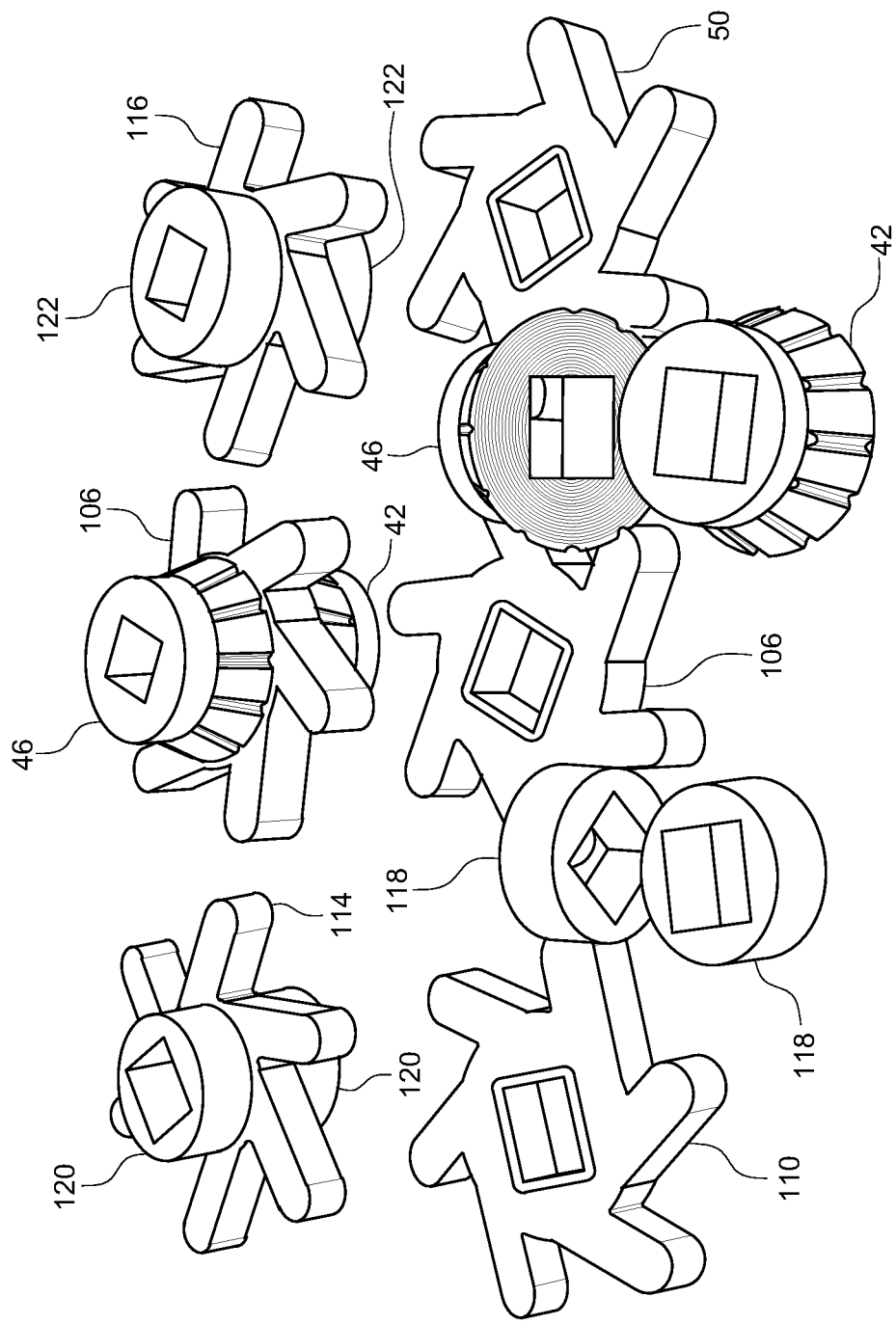
FIG. 9 is a photograph of various color-coded modular star components, according to the present invention.

FIG. 9 shows various color-coded interchangeable modular star components suitable for being included in system 30 (see FIG. 1). For example, system 30 may include a finger section module 106 having finger members made of a fifth material with a selected fifth color; a finger section module 110 having fingers members made of a sixth material with a sixth selected color; a finger section module 114 made of a seventh material with a seventh selected color and having a different geometry than finger section module 50 (e.g., fingers of module 114 are shown projecting tangentially from an intermediate portion and having a concavely curved surface between adjacent fingers); and a finger section module 116 being made of an eighth material with a selected eighth color and having a geometry similar to finger section module 114. As shown, finger section modules 50, 106, and 110 have similar geometries.

System 30 may include hub modules 118; hubs 120 connected to opposite sides of the intermediate portion of finger section module 114; and hubs 122 connected to opposite sides of an intermediate portion of finger section module 116. Hub modules 118 may be operatively disposed on the shaft and pressed against opposing surfaces of any suitable finger section module.

Hub modules 118 and hubs 120,122 may extend substantially parallel to the shaft when in the operative position, and as such, when combined with any suitable finger section module, may define a differently dimensioned and/or sized grading gap than would otherwise be defined by hub modules 42, 26. For example, hub modules 118 may provide a narrower but more rectangular grading gap than hub modules 42 or 46, and hub modules 120 may provide a narrower but longer grading gap than hub modules 118.

A modular design of components provides for a variety of hub module and finger section module combinations, allowing for system 30 to be customized to various applications (e.g., different varieties of produce) in which all or a subset of the components may be reused and/or recombined. For example, the modular design of system 30 may provide for a variety of hub geometries and/or materials to be used with the same finger section geometry and/or materials, and may provide for a variety of finger section geometries and/or materials to be used with the same hub geometry and/or materials.

For example, finger section module 50 having fingers made of the fourth material may be operatively positioned on the shaft between any suitable combination of tapered hub modules 42, 46 and non-tapered hub modules 118 (among others), and/or hub modules 42, 46 may be operatively positioned on the shaft between any suitable finger section modules (e.g., finger section modules 106 or 110).

The modular design of system 30 may simplify manufacturing. For example, the modular designed star components can be fabricated using one piece molds, whereas previous designs often required two piece molds and frequently had a parting line in the middle of the finger section. By using one piece molds, the modular design of system 30 may eliminate the parting line or flashing on the fingers.

Figure 10:
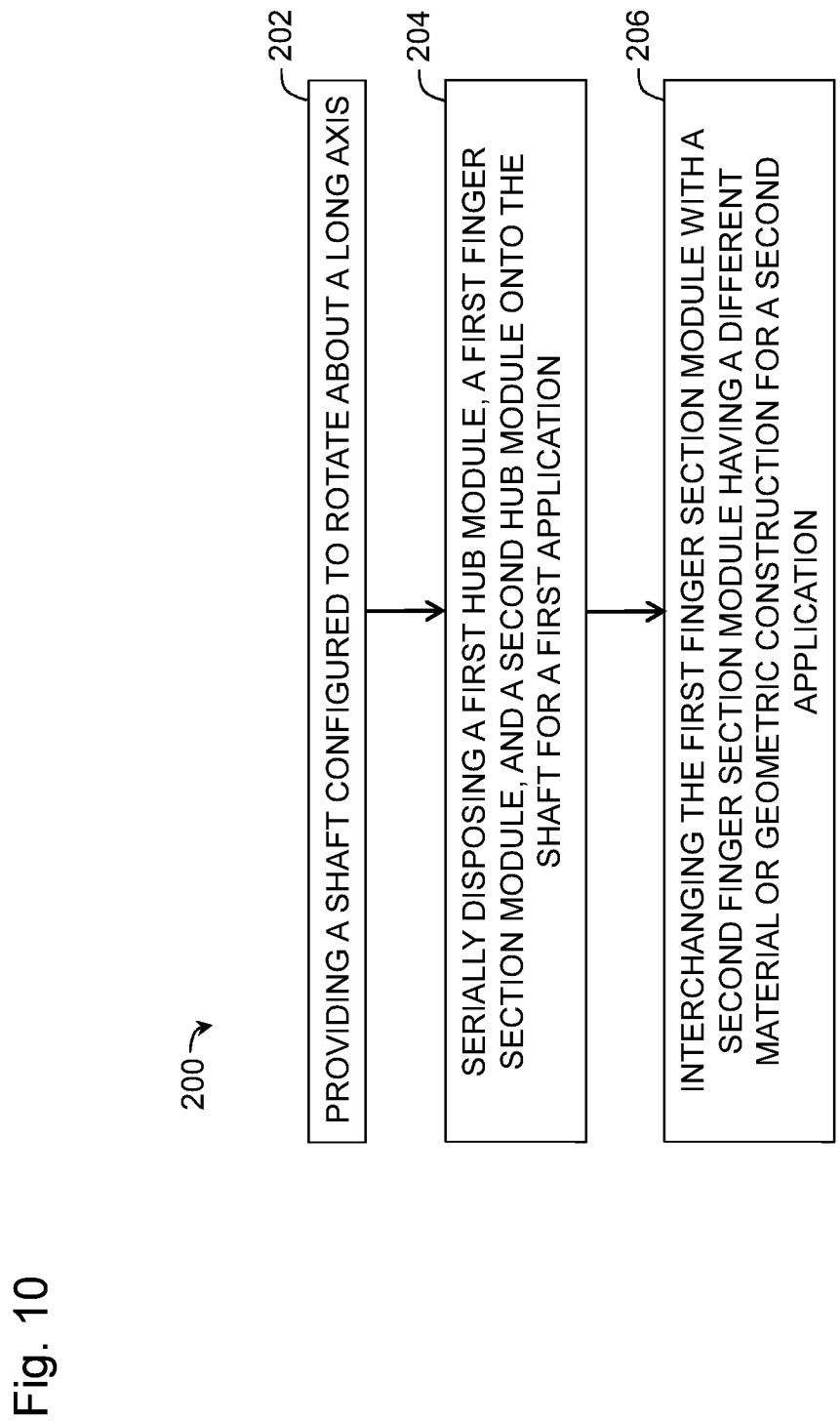
FIG. 10 is a flow chart depicting an exemplary method of using a modular star system, according to the present invention.

FIG. 10 depicts an exemplary method 200 of using a modular star system for grading, cleaning, and transporting produce, according to the present disclosure. Method 200 may include a step 202 of providing a shaft configured to rotate about a long axis. Method 200 may include a step 204 of serially disposing a first hub module, a first finger section module, and a second hub module onto the shaft for a first application. Method 200 may include a step 206 of interchanging the first finger section module with a second finger section module having a different material or geometric construction for a second application.

In some embodiments of method 200, the first application may involve grading, cleaning, and transporting a first variety of produce, and the second application may involve grading, cleaning, and transporting a second variety of produce which is more easily bruised than the first variety. The finger members of the first finger section module (e.g., finger section module 50—see FIG. 9) may be made of a harder material than the finger members of the second finger section module (e.g., finger section module 106—see FIG. 9).

Additional Features and Versions of the Invention

Attachments A-C show additional features and versions of the invention. A corn husking rollers system and method is shown and described in Attachment A. There are several features of the system and method, including the material used to coat the rollers. The system may be thought of as including at least one roller.

Referring to Attachment B, a grip-enhanced material system and method is disclosed and the grip-enhanced material could be used for any application that requires a grip-enhanced composite material, including non-slip applications. As disclosed in Attachment B, the applications include: (i) separator screen stars for use in an improved material separation system; and (ii) spacer bars for use with the separator screen stars to space them apart pre-selected distances.

Referring to Attachment C, a grip-enhanced separator screen star system and method is disclosed, including several features of the system and method, and including the material used to coat the stars. The system may be thought of as including at least one star.

The disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Inventions embodied in various combinations and subcombinations of features, functions, elements, properties, steps and/or methods may be recited in claims of a related application. Such claims, whether they focus on a different invention or the same invention, and whether different, broader, narrower, or equal in scope to the original claims, are also regarded as included within the subject matter of the present disclosure.

What is claimed:

1. A modular star system for grading, cleaning, and transporting produce, comprising:
   opposing, first and second hub modules having opposing, tapered surfaces;
   plural finger modules separated by the first and second hub modules; and
   wherein each finger module has finger members that are color-coded to indicate a characteristic of the finger module chosen from the group consisting of material composition and geometric shape.

2. The system of claim 1, wherein the finger and first and second hub modules are disposed on a shaft that has a long axis and is configured to rotate about the long axis, wherein outer surfaces of either of the finger or hub modules are color-coded to indicate the characteristic, and wherein the outer surfaces are substantially perpendicular to the long axis of the shaft.

* * * * *